(12) United States Patent
Elias (10) Patent No.: US 9,859,071 B2
(45) Date of Patent: Jan. 2, 2018

(54) METHOD, APPARATUS, AND SYSTEM FOR CONTROLLING ELECTRIC CURRENT

(75) Inventor: Holger Elias, Windach (DE)

(73) Assignee: Nokia Solutions and Networks OY, Espoo (FI)

( * ) Notice: Subject to any disclaimer, the term of this patent is extended or adjusted under 35 U.S.C. 154(b) by 764 days.

(21) Appl. No.: 14/241,941

(22) PCT Filed: Jun. 22, 2012

(86) PCT No.: PCT/EP2012/062101
§ 371 (c)(1),
(2), (4) Date: Apr. 9, 2014

(87) PCT Pub. No.: WO2013/029829
PCT Pub. Date: Mar. 7, 2013

(65) Prior Publication Data
US 2014/0239742 A1 Aug. 28, 2014

(30) Foreign Application Priority Data
Aug. 31, 2011 (EP) ..................................... 11179497

(51) Int. Cl.
*H01H 9/54* (2006.01)
*H02J 13/00* (2006.01)
(52) U.S. Cl.
CPC ............... *H01H 9/54* (2013.01); *H02J 13/00* (2013.01); *H02J 13/0006* (2013.01); *Y10T 307/826* (2015.04); *Y10T 307/865* (2015.04)

(58) Field of Classification Search
None
See application file for complete search history.

(56) References Cited

U.S. PATENT DOCUMENTS

| 6,507,273 B1* | 1/2003 | Chang ................... G05B 15/02 340/12.32 |
| 7,657,763 B2 | 2/2010 | Nelson et al. |
| 2003/0006905 A1* | 1/2003 | Shieh .................... G08C 17/02 340/12.29 |

FOREIGN PATENT DOCUMENTS

| JP | WO 2007074541 A1 * | 7/2007 | .......... H02J 13/0013 |
| WO | 2005039016 A1 | 4/2005 | |
| WO | 2007074541 A1 | 7/2007 | |

* cited by examiner

*Primary Examiner* — Rexford Barnie
*Assistant Examiner* — Swarna N Chowdhuri
(74) *Attorney, Agent, or Firm* — Lawrence A. Greenberg; Werner H. Stemer; Ralph E. Locher (57) ABSTRACT

A method for switching on and off electric current includes detecting a verification condition, switching on the electric current responsive to the detected verification condition, establishing a communication via a communication network after switching on the electric current, detecting a switch-off condition via the established communication, and switching off the electric current responsive to the detected switch-off condition. An apparatus and a system are described for controlling switching on and off electric current.

15 Claims, 2 Drawing Sheets

FIG. 2

METHOD, APPARATUS, AND SYSTEM FOR CONTROLLING ELECTRIC CURRENT

BACKGROUND OF THE INVENTION

Field of the Invention

The invention relates to a method for switching on and off electric current, and an apparatus and system for controlling switching on and off electric current.

Currently installed electro-mechanical meters for metering electrical energy consumption of, e.g., households and buildings, do not offer the capability of remotely controlling electric power delivery to said households and buildings. In particular these meters do not support remotely cutting off and reconnecting, i.e. remotely switching off and on electric current for electrical power delivery of said households and buildings. Intelligent metering equipment enables new functionality for energy utilities allowing remote delivery cut-off, that can be used, e.g., in cases of delivery contract expiration or non-payment by the customer or in case of general disaster situations like fire, gas or water pipe ruptures. If the conditions for delivery cut-off are removed, e.g., in case of new contract, availability of prepaid payment, etc., the intelligent metering equipment enables switching on the electric current after cut-off.

In order to provide such remote switching on and off capability, said metering equipment relies on an un-interrupted communication link to perform such switching actions. This is achieved by an in-build communication device, e.g., a PowerLine or 3GPP based wireless communication device, located in the intelligent metering equipment and powered permanently.

Since it is not possible under all conditions to solely rely on these built-in communication devices, also alternative external communication devices need to be used to enable intelligent metering and remotely controlling, i.e. remotely switching on and off the electric current for electrical power delivery. In order to cover a broadly accepted range of communication technologies, external communication devices, e.g., wired DSL, Modem, Fiber-optics, home located LANs, WLANs, and/or home gateway configurations, need to be considered, that are located behind the electricity cut-off device in or controlled by the intelligent metering equipment. Consequently switching off the electric energy delivery permanently interrupts communication over these metering equipment external communication devices in case of intentional power cut-off. Thus loss of communication capability results and restoration of normal electricity supply after a cut-off is not possible remotely due to loss of communication capability of the metering equipment.

BRIEF SUMMARY OF THE INVENTION

It is therefore a need in the prior art to provide a method, apparatus, and system for controlling electric current allowing remote switching on and off electric current based on usage of not permanently powered external communication devices.

This need is accomplished by the method for switching on and off electric current according to the features as claimed, and by the apparatus and system for controlling switching on and off electric current as claimed. Further, dependent claims refer to specific embodiments of the present invention.

According to an embodiment of the present invention there is provided a method for switching on and off electric current comprising the steps:
   Detecting a verification condition;
   Switching on the electric current responsive to the detected verification condition;
   Establishing a communication via a communication network after the switching on the electric current;
   Detecting a switch-off condition via the established communication; and
   Switching off the electric current responsive to the detected switch-off condition.

The method advantageously allows switching on the electric current for electrical power delivery to a household, house, apartment or building, if the electric current has been switched off before and the switching off the electric current leads to loss of communication capability, thus preventing remotely effecting a switching on the electric current.

This is accomplished by switching on the electric current due to detection of a verification condition. Said switching on the electric current is responsive to the detecting of the verification condition, e.g., performed immediately after the detecting of the verification condition. Thus after the switching on the electric current establishing a communication via a communication network is enabled due to switched on electric current, if, e.g., said communication is dependent from a communication device being powered by the switched on electric current. Establishing of said communication may be immediately after the switching on, responsive to the switching on, or be delayed a configurable time. Thus the establishing can be adapted to the needs of the communication device powered by the electric current. Via the established communication a remotely available switch-off condition can be detected and/or verified. The detecting of the switch-off condition is enabled, if or after the communication is established. The detecting is by usage of the communication via the communication network, e.g., by message based or by signal based communication. The detecting thus is dependent on the establishment and on at least temporary availability of the communication. In case no switch-off condition is detected, the electric current advantageously remains to be switched on, thus providing electric current, e.g., to the household, house, building. In case a switch-off condition is detected, the electric current is switched off. Switch-off conditions may be due to a contract expiration, a persisting contract expiration, a non-payment, a persisting non-payment, or a not available or persistently not available prepaid payment. Advantageously the method allows the checking of remotely available preconditions for providing the electric current. In case these preconditions are valid, i.e. a switch-off condition is not detected, the electric current remains to be switched on after a cut-off or switching off the electric current.

The communication network may be any mobile or fixed network, operating on base of unicast, multicast and/or broadcast techniques, making use of optical, electrical, and/or radio based transmission, including, e.g., Ethernet, ATM, IP, xDSL, WLAN, WiFi, power distribution networks, cable, satellite and/or terrestrial antenna based broadcast and/or unicast networks.

The verification condition can be or be associated with an expiration of a timer, i.e. an expiration of a time interval. In particular the verification condition may be one of an expiration of subsequent time intervals of variable length. Thus subsequent execution of the method can be achieved, wherein the variable length may increase. This advantageously allows less frequent checking of a persisting switched-off with increasing absolute time.

According to another embodiment the method further comprises the steps of

Detecting an initial switch-off condition for the electric current;

Switching off the electric current responsive to the detected initial switch-off condition.

This provides the advantage, that in the status of switched on electric current, an initial switch-off condition is detected, that leads to switching off the electric current. The initial switch-off condition may be related to a receiving of a switch off message. Such switch off message may be sent by a server of the utility company providing the electric current, e.g., in case of non-payment by a customer. Thus the electric current can be switched off remotely. The switching off of the electric current can be initiated by the server of the utility company providing the electric current.

According to another embodiment the step of detecting of the verification condition comprises a detecting of at least one of:

a verification event
a timer expiration
an input signal
a manual input
an insertion of a chip card
a connection to a data storage medium
a communication with a processing device, a PC, or a phone
an infrared signal
a radio frequency signal
a receipt of a message or signal from a electric supply network.

The verification event can be related to a signal of a photo sensor, an electrical, and/or a mechanical sensor. Thus the verification event can be due to, e.g., an activity of a maintenance craft. The timer expiration may be generated or invoked with configurable length. The length may depend from the time of an switching off the electric current responsive to the detected initial switch-off condition. The input signal may be or related to a mechanical, electrical, optical, temperature related, and/or radio frequency based input signal. Thus advantageously removal of a critical status related to these verification conditions leads to switching on the electric current. The latter switching on is after a switching off the electrical current due to the critical status. The manual input may be related to a push button or mechanical switch equipment. Thus a customer having finally paid previously non-paid invoices related to the customer's electric energy consumption may effect via the manual input the switching on the electric current and the persistent availability of the electric current, if a switch-off condition, e.g., related to non-payment is not detected. As well a chip card, such as for instance a personal identification card, a prepaid card, a telephone card, a cheque card, or a credit card may effect the detecting of the verification event. In particular insertion of such card into an appropriate card reading device connected to or being part of the metering equipment may lead to persistently switching on the electric current, if no switch-off condition is detected. Connection of a storage medium or communication with a processing device, a PC, or a phone may be appropriate for detecting the verification condition. Further, an infrared signal, or a radio frequency signal may be used for detection of the verification condition. This provides the advantage, that, even if the equipment in particular metering equipment executing the method, is locked and/or physically inaccessible by the customer, as expected, e.g., in apartment houses, the customer can effect the verification condition. The infrared signal may be generated by a remote control device, e.g., as known from TV or other consumer electronic devices. The radio frequency signal may comprise, WLAN, WiFi, Bluetooth, 433 MHz signals for switching purposes. Also receipt of messages or signals from the electric supply network may be used for detection of the verification condition. These messages and signals may comprise information and/or triggers and/or trigger information provided to a plurality of households, houses, buildings, apartments, in particular ordinarily or specifically provided messages, telegrams, and/or signals related to, e.g., night current switch-over or catastrophe alarming.

Verification conditions associated with a manual input by the customer, insertion of a card, connection of data storage media, connection to processing devices, locally provided infrared and/or radio frequency signals provide the further advantage, that these implicitly indicate and/or confirm, that a subsequent switching on of the switched off electric current is allowed and does not cause any danger or dangerous situations, e.g., for people possibly currently working at the electrical installation or due to switched on equipment unintentionally starting work with switching on the electric current of the household, house, apartment, building.

The electric supply network may be a power network, a national grid, a mains supply.

According to another embodiment the detecting of the switch-off condition comprises receiving a message via the communication network.

According to another embodiment the detecting of the switch-off condition comprises the using the established communication via the communication network.

It is a further embodiment, that the detecting of the switch-off condition comprises the steps of:

Evaluating of a status information, the status information being associated to the switch-off condition; and wherein the detecting of the switch-off condition further comprises at least one of:

Requesting the status information of the electric current via the communication network from a status server;

Receiving the status information of the electric current via the communication network from the status server.

According to this functionality an actually valid switch-off condition, e.g., exhaustion of prepaid budget, available in the status server, e.g., a server for billing and accounting of the utility company, can be requested and/or received over the communication network. This provides the advantage of enabling local evaluation of the status information with respect to relevant to a switch-off condition. If for instance the status information indicates or allows the conclusion, that a switch-off condition exists, such switch-off condition is detected resulting in switching-off the electric current responsive to the detecting of the switch-off condition. Thus the status information may have relevance for the detecting the switch-off condition.

According to another embodiment of the invention the switching off the electric current is correlated to loss of the established communication via the communication network or is responsive to an expiration of a supervision timer. Thus it can advantageously be avoided, that the electric current, e.g., due to a lack of successful establishment of the communication via the communication network, is provided for a period of time exceeding the length of the supervision timer. The supervision timer may be started with the switching on the electric current. The length of the supervision timer may be configurable, in particular it may be configurable according to the needs of a utility company providing the electric current. Further the length of the supervision timer may depend on and/or may be adjusted according to the communication equipment at a customer's location, the type of the customer's access to the communication network, and/or a quality of service provided by the communication network.

According to another embodiment of the invention the detecting of the verification condition is responsive to the switching off the electric current. This provides the advantage, that in case the electric current is switched on persistently due to absence of a detected switch-off condition unnecessary actions as switching on the already switched on electric current are avoided.

According to another embodiment of the invention the method further comprises the step of:
  Generating the verification condition, when the electric current is switched off.

Thus advantageously, a single or a subsequent verification condition can be generated. The generation can be executed periodically, after expiration of a fixed, variable, optionally configurable time period. The generation may be implemented as a timer expiration by a permanently or temporarily powered generation means.

According to another embodiment of the invention, the steps of the method may be performed in a metering equipment for electric current. The metering equipment may be permanently connected to the electricity network. The metering equipment may comprise and/or control a switching device for connecting or disconnecting the electric current from a household, a house, a building, an apartment within an apartment house.

According to a further embodiment of the present invention there is provided an apparatus for controlling switching on and off electric current comprising
  First detection means for detecting a verification condition, if the electric current is switched off;
  First switching control means for controlling a switching on the electric current responsive to the detected verification condition;
  Communication means for establishing a communication via a communication network, if the electric current is switched on;
  Second detection means for detecting a switch-off condition, if the communication is established; and
  Second switching control means for controlling a switching off the electric current responsive to the detected switch-off condition.

The apparatus advantageously allows controlling switching on the electric current for electrical power delivery to a household, house, apartment or building, if the electric current has been switched off before and the switching off the electric current leads to loss of communication capability, thus preventing remotely effecting a switching on the electric current.

This is accomplished by the fact that, when the electric current is switched off, the first switching control means due to the detected verification condition controls switching on the electric current, what enables the communication means to establish the communication and the second detection means to detect a switch-off condition due to the established communication. Thus responsive to the detected switch-off condition the electric current is switched off by the apparatus.

The apparatus may be permanently powered. Detection of the verification condition may be due to an event occurring within the apparatus, e.g., an expiration of a timer, or an external signal or message provided to the apparatus or a combination thereof. The apparatus may be or may be part of a metering equipment, e.g. an intelligent meter, for metering electric power consumption.

Pursuant to another embodiment the apparatus further comprises third detection means for detecting an initial switch-off condition for the electric current, wherein the second switching control means is adapted for controlling an initial switching off the electric current responsive to the detected initial switch-off condition.

The initial switch-off condition may be related to receiving a message via the communication network under support of the communication means, the message being sent from a server of a utility company. The message may indicate and/or explicitly express, that a switching off the electric current is requested under control of the apparatus. As well an apparatus internal event may be related to the initial switch-off condition such exhaustion of a prepaid payment on a prepaid card or a disruption of or failure in normal operation of the apparatus or the connected electricity network. The second switching control means may be adapted to support switching off the electric current in response to the detected initial switch-off condition as well as in response to the detected switch-off condition, thus advantageously reducing complexity and cost of the apparatus.

Pursuant to another embodiment the first detection means is adapted to detect at least one of:
  a verification event
  a timer expiration
  an input signal
  a manual input
  an insertion of a chip card
  a connection to a data storage medium
  a communication with a processing device, a PC, or a phone
  an infrared signal
  a radio frequency signal
  a receipt of a message or signal from a electric supply network.

The first detection means may detect any item of the above mentioned list and any combination thereof. The verification condition may be related to any of these items or any combination thereof. Consequently the first detection means advantageously covers a broad range of events reflecting input by a customer, activity of a customer, autonomous triggering, external communication and/or external signaling.

Pursuant to a further embodiment the communication means is adapted to receive a message via the communication network and provide the message to the second detection means, and the second detection means is adapted to receive the provided message.

Pursuant to a further embodiment the communication means is adapted to receive a message via the communication network and provide the message to the first detection means, and the first detection means is adapted to receive the provided message.

Pursuant to another embodiment the communication means is adapted to receive a request for sending a message via the communication network and to send the message via the communication network. The request for sending the message may in particular be provided by the second detection means.

Pursuant to a further embodiment the second detection means is adapted to communicate via the communication network with the aid of the communication means.

The communication means may advantageously provide communication capability via the communication network for the apparatus and its functional entities, thus enabling an economical implementation due to commonly used communication functionality provided by the communication means.

Pursuant to a further embodiment the second detection means comprises:

Evaluation means for evaluation a status information, the status information being associated to the switch-off condition; and further comprises at least one of:

Requesting means for requesting the status information of the electric current via the communication network from a status server;

Receiving means for receiving the status information of the electric current via the communication network from the status server.

According to this information stored and available in the status server, e.g., a server of a billing and/or accounting company or a server for billing and accounting of the utility company or an information server of a third party, can be requested and/or received over the communication network. This provides the advantage, that the apparatus is enabled to evaluation and/or interpretation of the status information with respect to relevance to a switch-off condition. If for instance it can be derived from the status information, optionally in synopsis with other information available to the evaluation means, that a switch-off condition exists, such switch-off condition is detected. Detection of the switch-off condition results in switching-off the electric current responsive to the detecting of the switch-off condition.

Pursuant to a further embodiment said apparatus comprises generation means for generating the verification condition, when the electric current is switched off.

According to this embodiment the apparatus is able to create the verification condition by itself. Advantageously such verification condition may be related to reaching a predefined and/or predetermined point in time after a switching off the electric current. Thus said point in time can be used to verify, if a switch-off condition for the electric current still exists. The generation means may be adapted to provide timer functionality. The timer functionality may be configurable with respect to the time length, i.e. the time the timer expires.

Pursuant to another embodiment said apparatus comprises at least one of:

an input device for a manual input and/or for an insertion of a chip card and/or for a data storage medium and/or for a processing device and/or for a phone and/or for an infrared signal and/or for a radio frequency signal;

a switching device for switching on and off the electric current, the switching device being controllable by the first switching control means and/or by the second switching control means;

a metering device for collecting metering data related to the electric current.

Thus the apparatus may advantageously comprise the switching device, the input device, and/or the metering device. This provides the advantage to flexibly provide and/or assemble possibly locally distributed or distributable functions in one box according to the needs of the customer. In particular a metering equipment with integrated apparatus for controlling switching on and off the electric current, with integrated switching device, and with input device, e.g., for manual input by the customer is an embodiment of the invention. As well the apparatus may comprise more than one switching device, enabling switching on and off more than one phase, in particular three-phase or polyphase current. As well the switching device may be adapted to switching on and off polyphase current. The switching device may be adapted for switching on and off alternating and/or direct current. The apparatus may as well comprise a plurality of input devices or an input device adapted to provide a plurality of input functions.

According to a further embodiment of the present invention there is provided a system for controlling switching on and off electric current comprising:

the apparatus;

a communication device for access to a communication network, the communication device being connected to the apparatus and being powered by the electric current;

a status server for providing status information on the switch-off condition of the electric current, the status server being connected to the communication network;

wherein the status server and the apparatus are adapted to communicate with each other via the communication device.

The communication device may be an ordinary xDSL modem connected to the apparatus via LAN or WLAN and ordinarily being powered as any other electrical device in a household or building. The communication device may also be a conventional modem connected to the PSTN. Thus advantageously the system relies on configurations already available in millions of households, enabling an economically attractive approach for solving the technical problem. In particular no special connectivity, special device, and/or specific cabling is needed besides the physical or radio based connection between the apparatus and the modem or the xDSL modem.

DESCRIPTION OF THE INVENTION

The making and using of presently preferred embodiments are discussed in detail below. It should be appreciated, however, that the present invention provides many applicable inventive concepts that can be embodied in a wide variety of specific contexts. The specific embodiments discussed are merely illustrative of specific way to make and use the invention, and do not limit the scope of the invention. Moreover, same reference signs refer to same technical features, if not stated otherwise. As far as "may" is used in this application, it means the possibility of doing so as well as the actual technical implementation.

Figure 1:
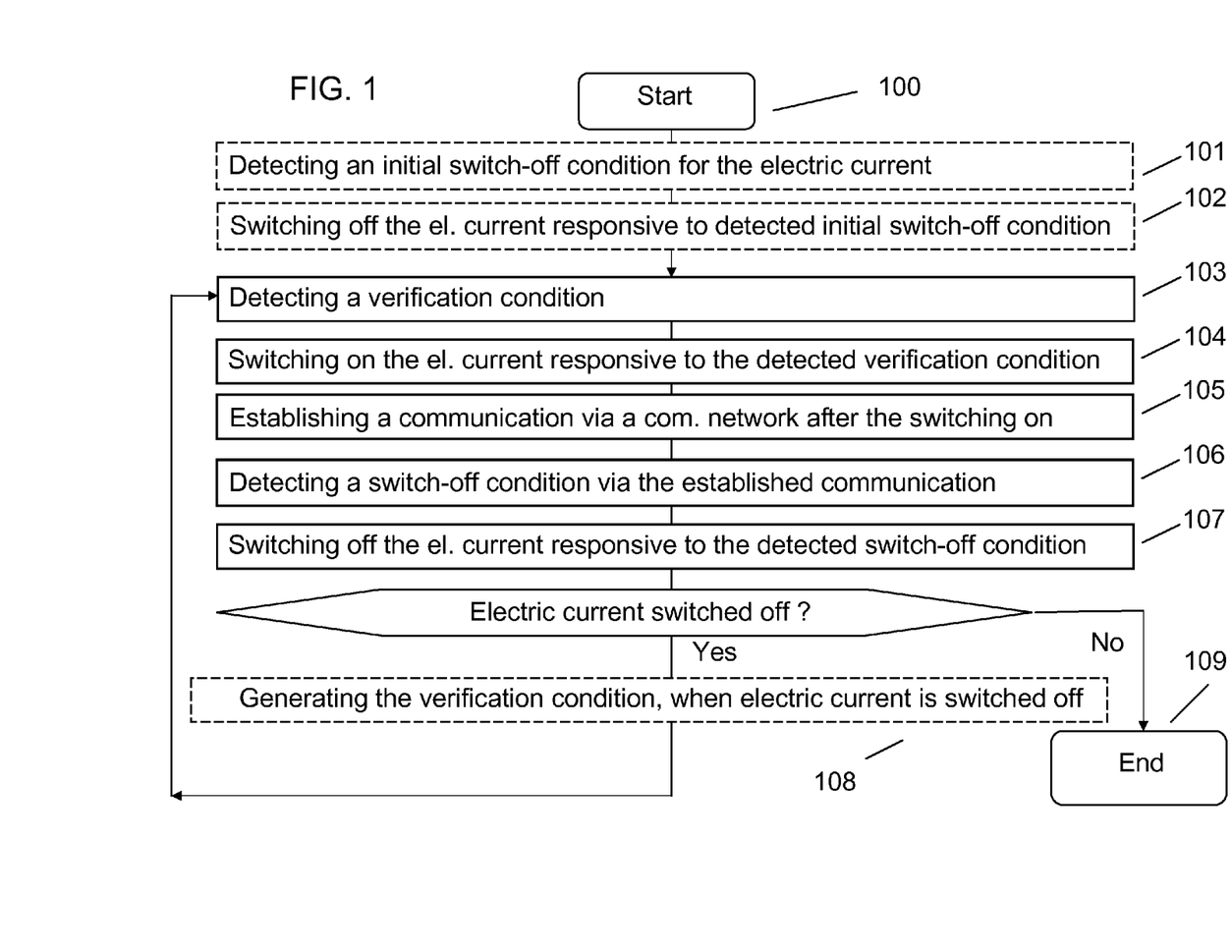
FIG. 1 presents a flow diagram showing method steps.

FIG. 1 presents a flow diagram showing method steps. After a start (step 100) an initial switch-off condition for the electric current is detected in a step 101. The initial switch-off condition is detected in the status of switched-on electric current. The detection of the initial switch-off condition may be due to receiving a message over a communication network, according to which message switching off the electric current is requested. Such message may be provided by a server of a utility company responsible for providing the electric current. The message may as well be provided by a server of a billing or invoicing company. Reason for sending the message may for example be contract expiration or insufficient or non-timely payment by a customer. As well a message, telegram or signal may be received over the electric current network, indicating, that switch-off of the electric current is requested. Such message, telegram or signal may be generated by the utility company for maintenance or contractual reasons. As well prepaid card related payments may be exhausted, wherein the prepaid payments may be stored on a prepaid card in physical connection to an intelligent metering equipment. Any of these exemplary events may lead to detection of the initial switch-off condition.

In a step 102 the electric current is switched off responsive to the detected initial switch-off condition. This is preferably done centrally, e.g., for the household, house or apartment of a customer. In case of polyphase current all phases may preferably be disconnected. With switching off the electric current responsive to the initial switch-off condition the status of switched-off electric current is entered.

In a step 103 a verification condition is detected. Preferably the step 103 is performed, when the electric current is switched off, i.e. in the status of switched-off electric current. In particular the verification condition may be due to the expiration of a time interval after the previous switching-off the electric current. The verification condition may as well be due to manual interaction by the customer or a craft, e.g., pressing a button, contacting a sensor, insertion of a card or a combination thereof. In particular the customer may have done invoiced payments with the intention to get the electric current switched on again. By pressing a button at the metering equipment or via other equivalent local input he confirms, that his house, apartment is without causing any danger ready for switching on the electric current again. In particular the verification condition may be due to a combination of a timer expiration and a manual input. Thus the verification condition may be detected, if a certain time, e.g., 1 day, after the preceding switching off the electric current has passed and a manual input, i.e. confirmation for switching on the electric current, has been done. As the detection of the verification condition leads in a step 104 to switching on the electric current, with an accordingly defined verification condition, it can be avoided, that the customer by repeatedly pressing an input button manages to get almost uninterrupted delivery of electric current without doing related payments.

In the step 104 the electric current is switched on responsive to the detected verification condition. With switching on the electric current delivery of electric current to the house, apartment of the customer is resumed. A communication device of the customer is powered again, initializes itself or is initialized and/or gets available again for access.

In a step 105 communication via a communication network is established after switching on the electric current. Preferably the step 105 is executed after a predetermined delay since the switching on the electric current. Thus it advantageously is achieved, that a subsequent attempt for establishing the communication will be successful. As well several subsequent attempts for establishing the communication may be performed, if the first subsequent attempt has not been successful. As well and/or in addition signals or conditions related to the communication, e.g., availability of LAN/WLAN access may be considered to define the point in time for establishing the communication. Establishing the communication may comprise a communication with said server of the utility company responsible for providing the electric current or said server of the billing or invoicing company. In particular the established communication may comprise sending a message, e.g., a message requesting a status information, to at least one of said servers.

In a step 106 a switch-off condition is detected via the established communication. Via the established communication with at least one of said servers a message with status information may be received. The status information may be related to a switch-off condition for the electric current of the customer. E.g., the status information may comprise the information, that the requested payments have not been received from the customer, the status information as well may simply comprise the information, that the utility company still intends to keep the electric current for the customer switched off. As well the status information may comprise the information, that the electric current shall be kept switched off, or be switched on at a certain time in the future, e.g., due to a new contract with another customer. Any of these alternatives may result in detection of a switch-off condition for the electric current, as they implicitly or explicitly request switching off the electric current at the time of receiving the status information.

In a step 107 the electric current is switched off responsive the detected switch-off condition. In case the electric current is not switched off after the step 107 the method ends with step 109. In case the electric current is switched off after the step 107, a step 108 is performed.

In the step 108 a verification condition is generated, when the electric current is switched off. The generation of the verification condition may comprise a starting of a timer, e.g., in an intelligent metering equipment. The expiration of this timer may be considered to be the verification condition or may be considered to be together with other conditions the verification condition. The length of the timer may be predefined, randomly selected, selected according to a predefined algorithm, and/or related to the status information received. For instance in the case, that the status information contains the information, that the electric current should be switched on at a certain time in the future, the timer could be selected to expire at this time in the future. With generation the verification condition, the method is continued with the step 103.

The invention advantageously improves the remote control capabilities of electrical remote consumption measurement devices, relying on an external communication path. This is achieved by conditional restoration of electrical power also to external communication devices for the purpose to validate a contractually granted electricity supply. The invention overcomes missing electrical power supply to external communication devices by locally triggered restoration capabilities in the metering equipment, allowing a pre-programmed conditional supply of electricity to, e.g., a building, and consequently also to the outlet, where the external communication device is installed. This enables the intelligent metering equipment to communicate to, e.g., a server at a metering company to verify a regular delivery situation, where electrical power stays on, or optionally to cut-off electrical power supply again.

Figure 2:
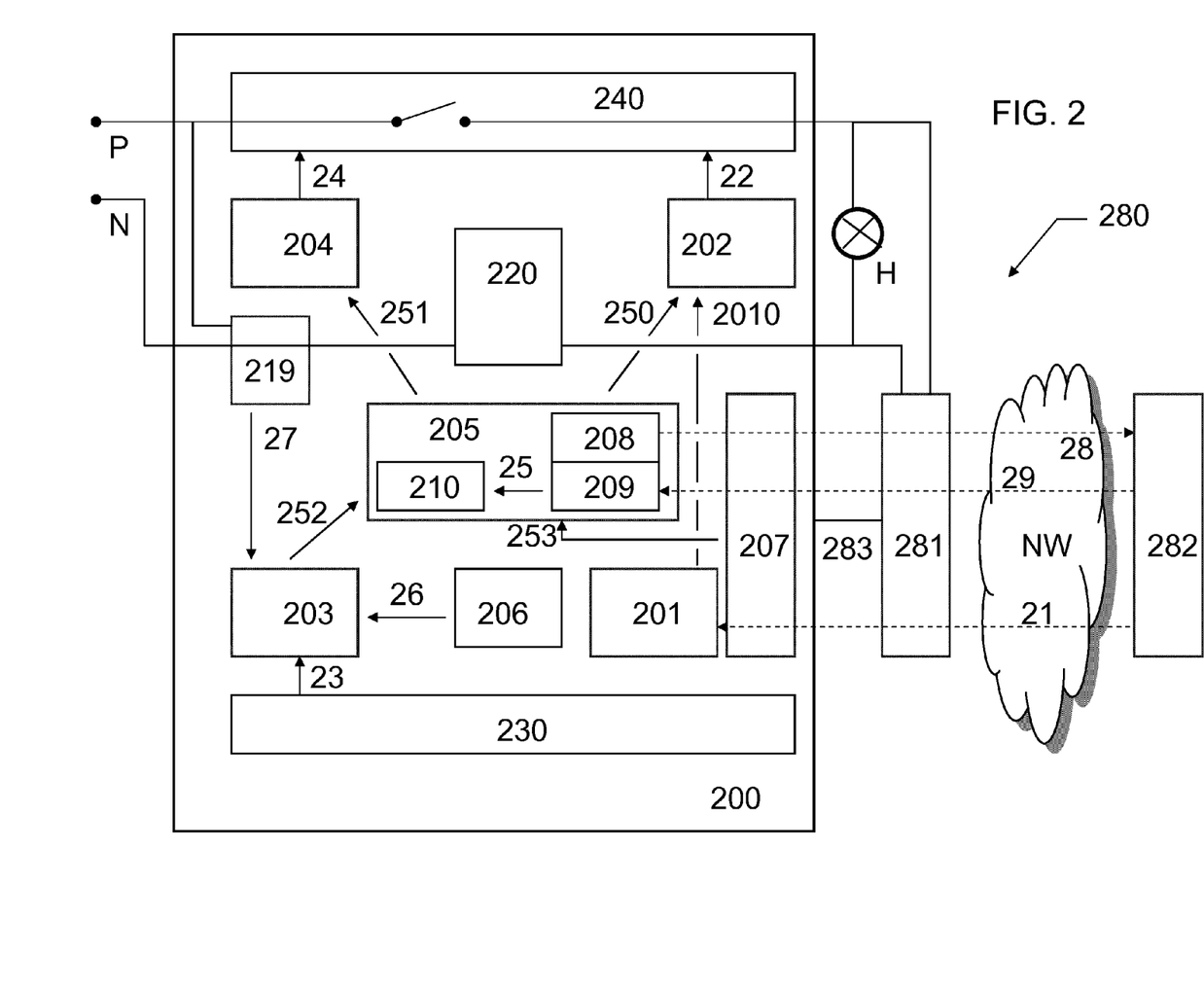
FIG. 2 presents a simplified block diagram of an embodiment for illustration of an information flow assigned to an apparatus and a system for controlling switching on and off electric current.

FIG. 2 presents a simplified block diagram of an embodiment for illustration of an information flow assigned to an apparatus 200 and a system 280 for controlling switching on and off electric current.

The system 280 may comprise the apparatus 200, a communication device 281 and a status server 282. The communication device 281 and the status server 282 are connected via and have access to a communication network NW. The communication device 281 and the status server 282 may be adapted to exchange message based information via the communication network NW, e.g., an IP based communication network. In particular the status server 282 may be a billing server of a utility company and the communication device 281 may be a xDSL modem located in the house or apartment of a customer of the utility company. In particular, the utility delivers the electric current to the house or apartment of the customer. According to a normal delivery situation electric current is delivered to the house or apartment, i.e. the electric current is switched on, thus powering an electrical power consuming equipment H of the house or apartment and powering as well the communication device 281 of the customer. The electric current is provided to the house or apartment by a pair of electrical lines, the phase line P and the neutral line N, which cross the apparatus 200 and connect to the electrical power consuming equipment H of the house or apartment and the communication device 281 of the customer. The communication device 281 is connected via a communication relationship 283 with the apparatus 200. The communication relationship 283 may comprise a wireless or a wired connection, in particular a WLAN connection or a LAN connection and/or cabling.

The apparatus 200 may comprise an input device 230 for, e.g., reception of an manual input by the customer. The apparatus 200 may further comprise a switching device 240, that comprises a switch adapted to disconnect the phase line P from the power consuming equipment H and the communication device 281. The apparatus 200 may further comprise a metering device 220 for metering the electric power consumption of the power consuming equipment H and the communication device 281. The metering device 220 may be connected to the neutral line N and the power consuming equipment H and the communication device 281. Thus the apparatus 200 may be an intelligent metering equipment for metering of electrical power consumption with integrated switching device 240 for switching on and off the electric current and with integrated input device 230 for reception of inputs and/or interactions by the customer.

Starting with the ordinary situation of switched on electric current, i.e., the switching device 240 is in the status of connecting the phase line P to the power consuming equipment H and the communication device 281, due to non-payment of invoices the status server 282 sends message 21 via the communication network NW and the communication device 281 and communication relationship 283 to the apparatus 200. The message 21 will be received in the communication means 207 of the apparatus 200 terminating the communication relationship 283. The message 21 will be forwarded to the third detection means 201 within the apparatus 200. The message 21 provides an information, that enables the third detection means 201 to conclude, that the electric current shall be switched off. Thus on base of the message 21 the third detection means 201 detects an initial switch-off condition and therefore informs the second switching control means 202 of the apparatus 200 accordingly via a communication relationship 2010. Responsive to this the second switching control means 202 controls via a communication relationship 22 the switching device 240 to switch off the electric current.

As the electric current is switched off, a first detection means 203 of the apparatus 200 enters a status, in which it tries to detect a verification condition. Such verification condition may be provided and/or caused via a communication relationship 23 by the input device 230, e.g., in case of manual confirmation by the customer, that the switching on the electric current is requested and/or admissible. As well such verification condition may be provided and/or caused via a communication relationship 26 by a generation means 206 of the apparatus 200, e.g., due to the fact, that with switching off the electric current the generation means 206 may have started a timer, wherein expiration of this timer causes the generation means 206 to inform the first detection means 203 accordingly via communication relationship 26. As well such verification condition may be provided and/or caused via a communication relationship 27 by a termination means 219 of the apparatus 200. The termination means 219 is connected to the electricity network an may receive signals and/or telegrams, e.g., night current switch-over, etc., that may be considered as the verification condition. If the termination means 219 receives such information from the electricity network, it informs the first detection means 203 accordingly. According to the configuration of the first detection means 203 the first detection means 203 evaluates the input via communication relationships 23, 26, and/or 27 and detects a verification condition and may inform a second detection means 205 of apparatus 200 via a communication relationship 252 accordingly. The second detection means 205 responsive to the detected verification condition may inform a first switching control means 204 of the apparatus 200 via a communication relationship 251 accordingly to control switching on the electric current. Alternatively the first detection means 203 may inform the first switching control means 204 accordingly to control switching on the electric current. The first switching control means 204 via a communication relationship controls the switching on the electric current in the switching device 240. As result the power consuming equipment H and the communication device 281 are powered again. As consequence the communication means 207 is able and/or enabled to establish communication via the communication network NW again.

Thus preferably with a certain delay to compensate possible delays for establishment of the lower layers, e.g., layers 1 to 6, of said communication a requesting means 208 comprised in the second detection means 205 sends a request message 28 for requesting a status information to the status server 282 via the communication means 207, via the communication device 281 and via the communication network NW. In response a receiving means 209 comprised in the second detection means 205 receives an answer message 29 with the requested status information from the status server 282, the answer message 29 being sent via the communication means 207, via the communication device 281 and via the communication network NW. The answer message 29 is transferred via a communication relationship 25 to an evaluation means 210 for evaluation of the status information. If the status information allows the conclusion, that a switch off condition exists, the second detection means 205 detects with the help of the evaluation means 210 a switch-off condition.

The second detection means 205 responsive to the detected switch-off condition informs the second switching control means 202 via the communication relationship 250 accordingly to control switching off the electric current. The second switching control means 202 via the communication relationship 22 controls the switching off the electric current in the switching device 240. As result the power consuming equipment H and the communication device 281 are disconnected from electrical power, i.e. the phase line P, again.

Thus in practice, e.g., a manually activated push-button switch, but not limited to this mechanical design, i.e. a knob, a key, etc. could do as well, built into the intelligent metering equipment may enable the above described conditional restoration of electricity supply. Pre-programmed and/or conditional restoration imply, that a severe limitation on electricity utilization shall apply, e.g., power is just restored for a reasonable time frame to reconnect a communication link, e.g., several minutes per day, thus inhibiting regular electricity usage, or allow for a limited maximum contingent of electricity to be activated after contract expiration, e.g., 1 h per day. By manual switch operation it is insured, that the customer and/or an activator who will be aware of any abnormal condition in the building, the condition eventually endangering someone else by sudden electricity restoration. In case of disaster recovery save operating conditions can also be assured prior to manual electricity restoration.

Abbreviations
3GPP 3rd Generation Partnership Project
ADSL Asymmetric DSL
ATM Asynchronous Transfer Mode
CDSL Consumer DSL
DSL Digital Subscriber Line
HDSL High Bitrate DSL
IDSL ISDN DSL
ISDN Integrated Digital Services Network
IP Internet Protocol
LAN Local Area Network
M2M Machine to Machine
PC Personal Computer
PSTN Public Switched Telephone Network
RADSL Radio Adaptive DSL
SDSL Symmetric DSL
SHDSL Single Pair HDSL
VDSL Very high speed DSL
Wi-Fi Trademark of Wi-Fi Alliance (Wi-Fi enabled device with access via wireless access network/hotspot)
WLAN Wireless Local Area Network
xDSL DSL technologies, summarized

The invention claimed is:

1. A method for switching on and off electric current, the method comprising:
   detecting a verification condition, while the electric current is switched off, for verification of a switch-off condition of the electric current;
   switching on the electric current at least of a communication device responsive to the detected verification condition;
   establishing a communication via a communication network after switching on the electric current, wherein said communication is dependent on the communication device being powered by the switched on electric current;
   detecting a switch-off condition via the established communication; and
   switching off the electric current at least of the communication device responsive to the detected switch-off condition.

2. The method according to claim 1, further comprising:
   detecting an initial switch-off condition for the electric current; and
   switching off the electric current responsive to the detected initial switch-off condition.

3. The method according to claim 1, wherein the step of detecting the verification condition comprises detecting at least one of the following:
   a verification event;
   a timer expiration;
   an input signal;
   a manual input;
   an insertion of a chip card;
   a connection to a data storage medium;
   a communication with a processing device, a PC, or a phone;
   an infrared signal;
   a radio frequency signal;
   a receipt of a message or signal from an electric supply network.

4. The method according to claim 1, wherein:
   the step of detecting the switch-off condition comprises:
   evaluating a status information, the status information being associated to the switch off condition; and
   the step of detecting the switch-off condition further comprises at least one of the following:
   requesting the status information of the electric current via the communication network from a status server; and
   receiving the status information of the electric current via the communication network from the status server.

5. The method according to claim 1, wherein the step of switching off the electric current is correlated to a loss of an established communication via the communication network or is responsive to an expiration of a supervision timer.

6. The method according to claim 1, wherein the step of detecting the verification condition is responsive to switching off the electric current.

7. The method according to claim 1, which further comprises generating the verification condition when the electric current is switched off.

8. An apparatus for controlling switching-on and switching-off of electric current, the apparatus comprising:
   first detection means for detecting a verification condition, while the electric current is switched off, for verification of a switch-off condition of the electric current;
   first switching control means for controlling a switching-on of the electric current at least of a communication device in response to a detected verification condition;
   communication means for establishing a communication via a communication network, when the electric current is switched on, wherein said communication is dependent on the communication device being powered by the switched on electric current;
   second detection means for detecting a switch off condition, when the communication is established; and
   second switching control means for controlling a switching-off of the electric current at least of the communication device in response to a detected switch-off condition.

9. The apparatus according to claim 8, further comprising third detection means for detecting an initial switch-off condition for the electric current, wherein said second switching control means is configured for controlling an initial switching-off of the electric current responsive to the detected initial switch-off condition.

10. The apparatus according to claim 8 wherein said first detection means is configured for detecting at least one event selected from the group consisting of:
    a verification event;
    a timer expiration;
    an input signal;
    a manual input;
    an insertion of a chip card;
    a connection to a data storage medium;
    a communication with a processing device, a PC, or a phone; an infrared signal; a radio frequency signal;

a receipt of a message or signal from an electric supply network.

11. The apparatus according to claim 8, wherein:
said communication means is configured for receiving a message via the communication network and for transmitting the message to said second detection means; and
said second detection means is configured for receiving the message.

12. The apparatus according to claim 8, wherein:
said second detection means comprises:
evaluation means for evaluation a status information, the status information being associated to the switch-off condition; and
said second detection means further comprises at least one of:
requesting means for requesting the status information of the electric current via the communication network from a status server; and
receiving means for receiving the status information of the electric current via the communication network from the status server.

13. The apparatus according to claim 8, further comprising a generation means for generating the verification condition when the electric current is switched off.

14. The apparatus according to claim 8, comprising at least one of the following:
an input device for a manual input and/or for an insertion of a chip card and/or for a data storage medium and/or for a processing device and/or for a phone and/or for an infrared signal and/or for a radio frequency signal;
a switching device for switching on and off the electric current, said switching device being controllable by said first switching control means and/or by said second switching control means;
a metering device for collecting metering data related to the electric current.

15. A system for controlling a switching-on and a switching-off of an electric current, the system comprising:
the apparatus according to claim 8;
a communication device for access to a communication network, said communication device being connected to said apparatus and being powered by the electric current;
a status server connected to the communication network and for providing status information on a switch-off condition of the electric current;
said status server and said apparatus being configured to communicate with one another via said communication device.

* * * * *